Figure 1:
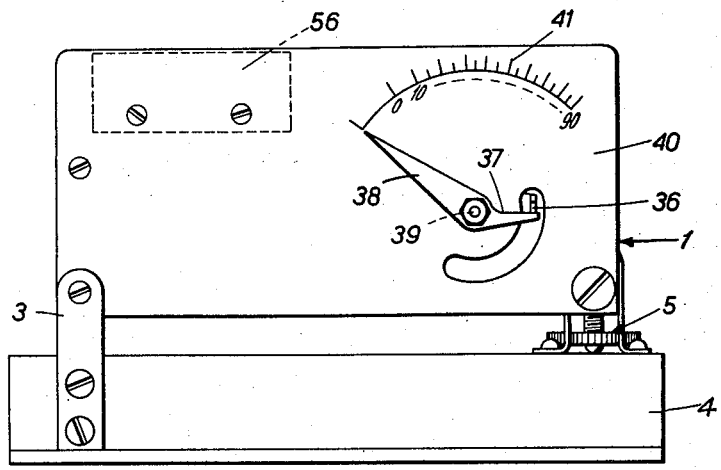

May 25, 1965   W. W. H. CLARKE   3,184,977
BRAKE TESTERS
Filed April 19, 1963   3 Sheets-Sheet 1

Inventor
WALTER W.H. Clarke
By
Watson, Cole, Grindle &Watson
Attorneys

May 25, 1965 W. W. H. CLARKE 3,184,977
BRAKE TESTERS
Filed April 19, 1963 3 Sheets-Sheet 2
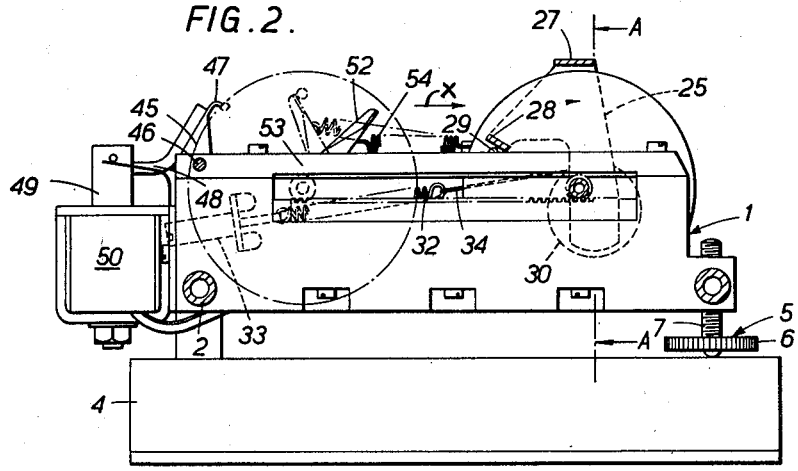
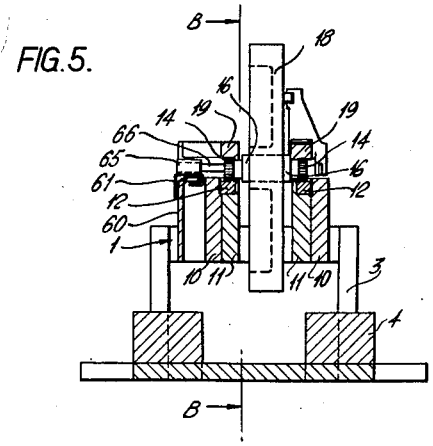
INVENTOR
WALTER W. H. CLARKE
By
WATSON, COLE, GRINDLE & WATSON
ATTORNEYS

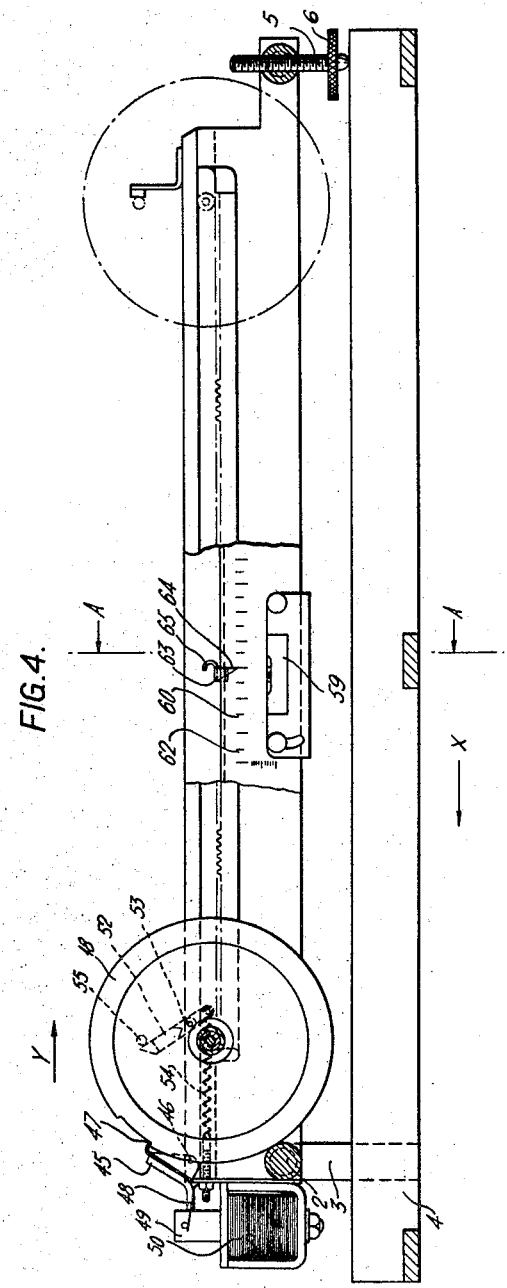

United States Patent Office 3,184,977
Patented May 25, 1965

3,184,977
BRAKE TESTERS
Walter Wilson Hugh Clarke, Woking, Surrey, England, assignor to Inertia Switch Limited, a company of Great Britain
Filed Apr. 19, 1963, Ser. No. 274,267
11 Claims. (Cl. 73—492)

This invention relates to apparatus for giving indications dependent on average acceleration or deceleration of a vehicle e.g. for brake testing.

Various types of apparatus have been devised to test vehicle brakes which give an indication of peak deceleration. This may not develop immediately the brake is applied and may not be maintained, so that such apparatus cannot give any indication or prediction of stopping distance. The object of the present invention is to provide simple apparatus capable of giving an indication of average deceleration, from which stopping distance can be predicted. The invention is however not limited to measurements of deceleration, and enables acceleration to be measured also.

The apparatus according to the invention comprises a frame, a flywheel mounted for rotation with respect to the frame, means whereby on mounting of the frame in an accelerating vehicle the flywheel receives a first acceleration which is dependent on vehicle acceleration, means to impose a predetermined second acceleration on the flywheel opposite in direction to the first acceleration, the arrangement being such that finally the flywheel comes to rest, and means to indicate the position at which the flywheel comes to rest said position being dependent on the average acceleration applied to the vehicle.

In one preferred form of the apparatus, the flywheel is mounted to run along a track on the frame with linear and rotational velocity related always in constant proportion, the frame being on installation of the apparatus in a vehicle mounted so that the track runs longitudinally thereof. The arrangement may be such that the flywheel tends to rotate when the vehicle exhibits the acceleration which is to be measured, in which case the second acceleration is such as to arrest movement of the flywheel: the second acceleration may be imposed by a spring which is gradually stressed by the movement of the flywheel. Alternatively the arrangement may be such that the vehicle acceleration tends to slow down the rotation of the flywheel, when the second acceleration is given to the flywheel by way of an initial impulse, for example by release of a previously stressed spring.

In the foregoing two paragraphs the expression "acceleration of the vehicle" is intended to include both positive acceleration and negative acceleration, i.e. retardation.

When it is required to test the brakes of a vehicle, it is preferred, according to the invention, to employ a release means for the flywheel which is actuated immediately on depression of the brake pedal, so as to take account of delay in the brake mechanism, which is a common fault in power-assisted brakes, for example. The preferred apparatus can therefore be used to predict stopping distance in such a case, as well as in the case of brakes acting immediately the pedal is depressed.

Figure 3:
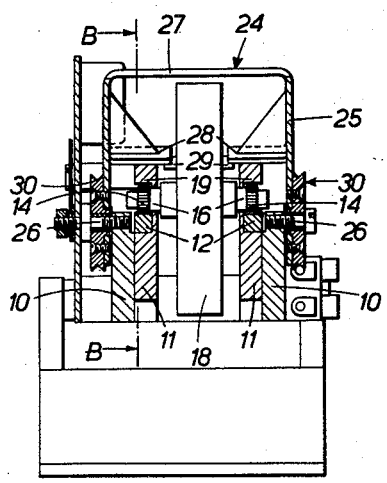

Two forms of brake testing apparatus according to the invention will now be described by way of example with reference to the accompanying drawing, in which:

FIGURE 1 is a side elevation of the first form of apparatus;

FIGURES 2 and 3 are respectively a longitudinal and a transverse section of the FIGURE 1 apparatus, the FIGURE 2 section plane being indicated at B—B in FIGURE 3 and the FIGURE 3 section plane at A—A in FIGURE 2, and FIGURES 4 and 5 are views similar to FIGURES 2 and 3 respectively of the second form of apparatus.

Referring to the drawings, the apparatus shown in FIGURES 1 to 3 comprises a frame designated generally 1 pivotally mounted upon a pivot pin 2 carried upon arms 3 upstanding from one end of a heavy rubber-soled base 4. The other end of the frame 1 is supported upon an adjustable levelling screw 5 including a knurled wheel 6 rigid with a spindle 7 having its lower end resting upon a flat surface of the base and its other end screwed into an internally threaded part of the frame.

The frame 1 comprises a pair of spaced parallel interconnected vertical side members each consisting of an outer plate 10 and an inner plate 11 secured flatly thereto. The inner plates 11 support a pair of similar horizontal racks 12 receiving pinions 14 mounted on stub-axles 16 projecting from a relatively massive flywheel 18. Retainer bars 19 are secured one on each side plate 11 to overlie the rack 12 thereon in spaced relation thereto so as to prevent the associated pinion 14 from jumping out of mesh with the rack, the pinion just clearing the retainer bar in normal movement.

In use of the apparatus the base 4 is mounted on a vehicle with the side plates 10, 11 of the frame 1 running longitudinally thereof and the flywheel 18 is free to move (after release as will shortly be described) from the rear end of the racks 12 (the left hand side of FIGURE 2), where it is situated at the start of any test, to a stopping position adjacent the forward end of the racks. The direction of vehicle movement is shown by the arrow X, the flywheel moves in this direction. At the stopping position a stirrup lever designated generally 24 is mounted. This lever 24 has a pair of arms 25 rotatably mounted on coaxial pivot pins 26 secured in the outer side plates 10, and a bight 27 interconnecting the arms 25 at a sufficient height to clear the flywheel 18. Symmetrical inward extensions 28 one on each arm 25 are provided to contact pins 29 extending from the flywheel 18 near its periphery when the flywheel comes to the stopping position. A pair of similar V-pulleys 30 are secured on the outside of the stirrup lever arms 25 coaxially with their pivot axis. Similar helical tension springs 32 each have one end mounted adjustably on a bar 33 fixed to the side plates near their rear end; a fine steel wire 34 is secured to the other end of each spring, trained over the appropriate V-pulley 30 and secured to the adjacent arm 25 of the stirrup lever 24.

The arrangement just described is such that before the flywheel 18 reaches the stopping position the stirrup lever 24 is urged against a locating stop (not shown) by symmetrical slight forces in the two springs 32. When the flywheel 18 reaches the stopping position the pins 29 contact the extensions 28 on the stirrup lever 24, as has been explained; due to its inertia the flywheel 18 continues to move forwardly and, as the pins 29 remain in contact with the extensions 28, the stirrup lever 24 turns on its pivot pins 26 and the springs 42 extend. When the flywheel 18 is finally brought to rest the kinetic energy built up therein during its movement along the track is fully transferred to the springs 32.

An extension 36 on the stirrup lever 24 contacts an arm 37 rigid with a pointer 38 pivoted with friction at 39 to a front panel 40 mounted on the frame 1 so as to lie parallel with the side plates 10, 11. The stirrup lever 24 thus moves the pointer 38 while the flywheel 18 comes to rest but as soon as this occurs the pointer stops owing to the friction at its pivot; reverse movement of the lever is without effect on it. The distance required to stop the flywheel need not be great, but the arrangement should be such as to avoid appreciable impact.

It will be apparent that the kinetic energy stored in the flywheel 18 at the stopping position, and thus that transferred to the springs 32 and shown by their extension, is dependent on the average deceleration of the vehicle over the time taken by the flywheel to move to the stopping position. Thus the pointer 38 will record in terms of average deceleration. The panel 40 can if desired be marked with a scale of braking efficiency, as shown at 41.

At the rear end of the frame 1 a catch member 45 is pivotally mounted upon a pin 46 secured to the frame transversely thereof. The catch member 45 terminates in a hook 47 which, in the lower position of the member shown in FIGURE 2, engages a recess in the flywheel 18 when this is at the rear end of the racks 12, i.e. in the position shown dotted. The catch member 45 has a rearward extension 48 which co-operates with the plunger 49 of a solenoid 50 mounted on the frame 1 whereby operation of the solenoid pivots the member 45 to its upper position (not shown in FIGURE 2) where the hook 47 disengages from the recess in the flywheel 18.

Interconnected arms 52 mounted in the frame 1 to pivot about a transverse axis indicated at 53 are urged forwardly by springs 54. When a test is to be started the flywheel 18 is brought to a rearward position on the racks 12. In the course of movements of the flywheel 18 the pins 29 thereon come against the arms 52 and move them rearwardly so tensioning the springs 54: finally the hook 47 rides up on the flywheel 18 and drops into the recess.

A pressure switch (not shown) located on top of the brake pedal of the vehicle provides for energization of the solenoid 50 to release the flywheel.

The effect of the arms 52 and springs 54 is to impart a predetermined initial acceleration to the flywheel 18 as soon as the solenoid 50 is energized.

The apparatus is calibrated so that when after due manipulation of the levelling screw 5 a levelling device 56 secured to the panel 40 shows that the frame 1 is level, the pointer 38 will indicate zero efficiency upon release of the flywheel when the deceleration of the vehicle is zero.

It will be appreciated that the apparatus describd can take account of the fact that braking may not begin at the instant the brake pedal is depressed, and can give an indication of stopping distance and braking efficiency in all circumstances.

Among possible variations of the apparatus described, the flywheel can be supported on ball-bearings running on plain tracks and mesh with the racks without pressure.

In the second embodiment of the invention, illustrated with reference to FIGURES 4 and 5, many parts are similar to those of the embodiment just described; these parts will be given the same reference numerals, and will not require detailed description. Thus, the apparatus of FIGURES 4 and 5 comprises, as before, a base 4 mounting a frame 1 which can be leveled with the aid of a spirit level 59 thereon: longitudinal frame members 10, 11 carry racks 12 on which run pinions 14 projecting axially on either side of a flywheel 18, thus supporting the flywheel for rotation and simultaneously translational movement longitudinally of the frame. Brake-actuated release means are provided at the left hand side of the frame 1 (as seen in FIGURE 4), comprising a catch member 45 normally engaging a notch in the flywheel 18 and movable to release the flywheel on energization of a solenoid. Initial acceleration is imparted to the flywheel, in carrying out a test, by means of tensioned springs 54 and a lever 52 urged thereby against a pin 55 on the flywheel. Further details of the construction illustrated in FIGURES 4 and 5 may be obtained by reference to the foregoing descripiton made with reference to FIGURES 1 to 3.

The main difference between the embodiment of FIGURES 1 to 3 and that of FIGURES 4 and 5 is that while in the former the flywheel 18 is allowed to travel in the same direction as the vehicle and arrested at a stopping position, in the embodiment of FIGURES 4 and 5 the flywheel 18 is projected by the springs 54 in the direction (shown by arrow Y) opposite to that of vehicle movement (again shown by an arrow X), and is allowed to come to rest along the length of the racks 12, by reason of the retardation of the vehicle. It is the location of this position of rest which is measured, and which indicates the average retardation of the vehicle. For this purpose the frame 1 carries at one side a plate 60 having its top edge 61 bent over and its outer face marked with a scale 62. A slider 63 is slidably mounted on the top edge 61 of the plate 60, and has a pointer 64 co-operating with the scale and a hook 65 to co-operate with an extension 66 of one stub axle 16. The slider 63 can readily be moved along the plate 60 by engagement of the axle extension 66 with the hook 65 and without any appreciable retarding effect on the flywheel 18. However, the friction between the slider 63 and the plate 60 is sufficient to retain the slider against accidental dislodgement after it has been moved by the flywheel to the position of rest thereof. Before starting a test the slider 63 is moved towards the front end of the plate 60.

It will be understood that the stirrup lever 24, springs 32 and associated elements provided to stop the flywheel in the embodiment of FIGURES 1 to 3 are not needed in that of FIGURES 4 and 5.

At the start of a test, the frame 1 is levelled, and the flywheel 18 and slider 63 duly set as above described. The depression of the vehicle brake pedal then suffices to initiate a measurement of average deceleration. Release of the flywheel as above described allows the spring 54 to apply thereto an initial acceleration, by reason of which the flywheel starts to move rearwardly with a given momentum over the racks 12, taking the slider 63 with it; the retardation of the flywheel due to the retardation of the vehicle brings the flywheel to rest at a position recorded by the slider. The scale can if desired be marked in average retardation, or braking efficiency, or stopping distance from a given speed.

It will be understood that both embodiments of the invention can be used to measure positive vehicle acceleration, if desired.

I claim:

1. Apparatus for measuring the acceleration of a horizontally moving vehicle comprising: a base for secural to the vehicle, the base defining a straight horizontal track extending longitudinally thereof; a flywheel mounted for rolling movement along the track; means to release the flywheel at a predetermined starting point along the track at the start of measurement for movement in a predetermined direction along said track under the influence of vehicle acceleration; spring means to exert a force on the flywheel to impart thereto an acceleration opposite to the influence of vehicle acceleration thereon, said spring means being spaced in the direction of initial travel relative to the flywheel when at its starting point for application of said force only after a predetermined travel of said flywheel; and means to register the distance traveled by said flywheel along the track in said predetermined direction from said starting point.

2. For giving indications dependent on average acceleration of a vehicle, apparatus comprising a frame, a pair of spaced parallel racks on the frame, the frame being mountable longitudinally of the vehicle, a flywheel, a pair of pinions extending coaxially to either side of the flywheel and meshing with the racks; release means to hold the flywheel at a predetermined starting point along the track and to release the flywheel on external actuation, spring-operated means to act upon the flywheel with a force which increases with displacement of the flywheel from said starting point whereby the velocity acquired by the flywheel after release thereof by the release means is destroyed by said spring-operated means, said spring operated means being spaced in the direction of initial travel relative to the flywheel when at its starting point for application of said force only after a predetermined travel of said flywheel, and means to indicate the position at which the flywheel comes to rest.

3. Apparatus as claimed in claim 2, wherein said spring-operated means includes an angularly movable lever with which a projection on the flywheel comes into contact, and a spring acting on the lever.

4. Apparatus as claimed in claim 3, wherein the lever is U-shaped, the bight of the U clears the flywheel, and the arms of the lever are pivotally connected to the frame.

5. Apparatus as claimed in claim 2, including means to impose upon the flywheel an initial acceleration towards said spring-operated means, upon release of the flywheel by the release means.

6. Apparatus as claimed in claim 5, wherein the means to impose said additional acceleration comprises a spring-urged lever acting against a projection on the flywheel, the spring being stressed when the flywheel is at said starting point.

7. Apparatus as claimed in claim 3, wherein the indicator means is a pointer pivoted coaxially with said spring-urged lever and movable thereby in one direction only against slight friction.

8. For giving indications dependent on average acceleration of a vehicle, apparatus comprising a frame, a pair of spaced parallel racks on the frame, the frame being mountable longitudinally of the vehicle, a flywheel, a pair of pinions extending coaxially to either side of the flywheel and meshing with the racks, release means to hold the flywheel at a predetermined starting point along the track and to release the flywheel on external actuation, spring-operated means to project the flywheel along the racks from said starting point with predetermined momentum upon release of the flywheel by the release means, and means to indicate the position at which the flywheel comes to rest when said momentum of the flywheel is destroyed due to acceleration of the vehicle.

9. Apparatus as claimed in claim 8, wherein said spring-operated means comprises a lever articulated to the frame and spring-urged to press against a projection on the flywheel when the flywheel is at its starting point.

10. Apparatus as claimed in claim 8, wherein said indicator means comprises a slider movable by the flywheel over a scale in one direction only against slight friction.

11. Apparatus as claimed in claim 8, wherein the release means includes a catch member engaging a projection on the flywheel when the flywheel is in its starting position and a solenoid connected to the catch member and energizable to withdraw it from engagement with the projection on the flywheel.

References Cited by the Examiner
UNITED STATES PATENTS

| | | | |
|---|---|---|---|
| 1,607,671 | 11/26 | Grabfield et al. | 73—125 X |
| 2,394,974 | 2/46 | Bevins | 73—492 |
| 3,020,367 | 2/62 | Bariffi | 73—514 |
| 3,064,483 | 11/62 | Laubenfels | 73—514 |
| 3,122,023 | 2/64 | Gledhill | 73—503 |

RICHARD C. QUEISSER, Primary Examiner.

JAMES J. GILL, Examiner.